US011562195B2

(12) United States Patent
Koekemoer

(10) Patent No.: US 11,562,195 B2
(45) Date of Patent: Jan. 24, 2023

(54) SYSTEMS AND METHODS FOR MONITORING AN ATTACHMENT FOR A MINING MACHINE

(71) Applicant: Joy Global Underground Mining LLC, Warrendale, PA (US)

(72) Inventor: Renier Koekemoer, Perth (AU)

(73) Assignee: Joy Global Underground Mining LLC, Warrendale, PA (US)

( * ) Notice: Subject to any disclaimer, the term of this patent is extended or adjusted under 35 U.S.C. 154(b) by 0 days.

(21) Appl. No.: 17/468,492

(22) Filed: Sep. 7, 2021

(65) Prior Publication Data

US 2021/0406637 A1 Dec. 30, 2021

Related U.S. Application Data

(63) Continuation of application No. 15/678,536, filed on Aug. 16, 2017, now Pat. No. 11,144,808.

(51) Int. Cl.
*G06K 19/077* (2006.01)
*H04Q 9/00* (2006.01)
(Continued)

(52) U.S. Cl.
CPC ........ *G06K 19/07758* (2013.01); *E02F 3/966* (2013.01); *E02F 9/26* (2013.01);
(Continued)

(58) Field of Classification Search
CPC ........ G06K 19/07758; G06K 19/07773; E02F 3/966; E02F 9/264; E02F 9/26; E02F 9/267; H04Q 9/00; H04Q 2209/47
See application file for complete search history.

(56) References Cited

U.S. PATENT DOCUMENTS 6,510,902 B1 * 1/2003 Prokop .................. E02F 3/966 173/1
7,267,182 B2 * 9/2007 Saha ........................ E02F 9/26 173/141
(Continued)

FOREIGN PATENT DOCUMENTS

JP 6085710 B1 2/2017

OTHER PUBLICATIONS

European Patent Office Extended Search Report for Application No. 18847070.2 dated Jun. 1, 2021 (12 pages).
(Continued)

*Primary Examiner* — Joshua G Kotis
*Assistant Examiner* — Scott A Howell
(74) *Attorney, Agent, or Firm* — Michael Best & Friedrich LLP

(57) ABSTRACT

Systems and methods for monitoring an attachment, such as a breaker head, for a mining machine. The system includes a breaker head, a wireless identification tag, a sensor, and an electronic processor. The wireless identification tag is coupled to the breaker head and includes a tag memory storing an identifier of the breaker head and an antenna. The sensor is configured to generate measurement data associated with the breaker head. The electronic processor is configured to receive measurement data from the sensor, generate a notification based on the measurement data, and transmit the notification to the wireless identification tag. Additionally, the wireless identification tag is configured to store the notification. The notification can then be later retrieved from the wireless identification tag by various devices, such as a further mining machine or a reader device of maintenance personnel.

10 Claims, 8 Drawing Sheets

(51) Int. Cl.
*E02F 3/96* (2006.01)
*E02F 9/26* (2006.01)

(52) U.S. Cl.
CPC .............. *E02F 9/264* (2013.01); *E02F 9/267* (2013.01); *G06K 19/07773* (2013.01); *H04Q 9/00* (2013.01); *H04Q 2209/47* (2013.01)

(56) References Cited

U.S. PATENT DOCUMENTS 8,145,394 B2 * 3/2012 Chiorean ............. G01B 21/042 701/33.1
8,359,143 B2 * 1/2013 Colwell .................. E02F 9/265 177/147
8,704,507 B2 4/2014 Oksman et al.
9,309,649 B2 * 4/2016 Nishikawa ............ E02F 9/2285
9,376,784 B2 * 6/2016 O'Donnell .............. E02F 3/435
10,289,097 B2 * 5/2019 Butler ................... G01S 5/0027
10,487,478 B2 * 11/2019 Reed ....................... E02F 3/435
2007/0200703 A1 * 8/2007 Baker .................. G06K 7/0008 340/572.1
2009/0259373 A1 * 10/2009 Nichols ................... E02F 9/264 701/50
2012/0250815 A1 * 10/2012 Oksman .................. E02F 3/966 377/16
2015/0107075 A1 * 4/2015 Clarke .................. E02F 9/2833 29/703
2015/0129666 A1 * 5/2015 Butler .................. G06K 19/073 235/492
2015/0284935 A1 * 10/2015 Egger ................... E02F 9/2808 701/34.4
2016/0340866 A1 * 11/2016 Koetz ....................... E02F 9/26
2019/0057295 A1 * 2/2019 Koekemoer ..... G06K 19/07758
2019/0284784 A1 * 9/2019 Darlington ............... G07C 3/08

OTHER PUBLICATIONS

International Search Report and Written Opinion for Application No. PCT/US18/00214 dated Oct. 30, 2018 (19 pages).
Australian Patent Office Examination Report for Related Application No. 2018318700 dated Oct. 19, 2022 (3 pages).

* cited by examiner

SYSTEMS AND METHODS FOR MONITORING AN ATTACHMENT FOR A MINING MACHINE

RELATED APPLICATIONS

This application is a continuation of U.S. Application Ser. No. 15/678,536, filed on Aug. 16, 2017, the entire content of which is hereby incorporated by reference.

FIELD

Embodiments described herein relate to systems and methods for monitoring an attachment for a mining machine.

SUMMARY

Various mining machines use attachments to perform a variety of functions. For example, a breaker attachment can be used for demolishing concrete or rock by utilizing hydraulics to deliver a percussive force to the concrete or rock. The attachment is removable and is therefore usable by a variety of machines. However, tracking the usage of the attachment may be difficult. Remote monitoring apparatuses are bulky, expensive, and may require access to the mining machine's hydraulic system, which could interfere with the operation of the mining machine's hydraulic system and void a warranty of the mining machine. Furthermore, because the attachment is removable, tracking operational data related to each individual attachment is difficult, as the operator of the machine or the owner of the machine may have to track the operational data by hand or keep detailed electronic records and diligently transfer the electronic records to the correct location when the attachment is transferred.

Embodiments described herein track operational data of an attachment for a mining machine are transportable, reliable, and do not interfere with the hydraulics of the mining machine to which the attachment is secured. Further, embodiments accurately track operational data and the operational data is easily accessible even when the attachment is transferred to another machine or new location.

In one embodiment, a system for monitoring an attachment for a mining machine is provided. The system includes a breaker head, a wireless identification tag, a sensor, and an electronic processor. The wireless identification tag is coupled to the breaker head and includes a tag memory storing an identifier of the breaker head and an antenna. The sensor is configured to generate measurement data associated with the breaker head. The electronic processor is configured to receive measurement data from the sensor, generate a notification based on the measurement data, and transmit the notification to the wireless identification tag. Additionally, the wireless identification tag is configured to store the notification.

In another embodiment, a method for monitoring an attachment for a mining machine is provided. The method includes generating, by a sensor, measurement data for a breaker head. An electronic processor receives the measurement data for the breaker head and generates a notification based on the measurement data for the breaker head. The electronic processor further transmits the notification to a wireless identification tag coupled to the breaker head. Additionally, the notification is stored on the wireless identification tag.

In another embodiment, a breaker head for a mining machine is provided. The breaker head includes a hydraulic system; a hammer bit driven by the hydraulic system; and a wireless identification tag. The wireless identification tag is coupled to the breaker head and includes an antenna, a tag electronic processor configured to receive a notification, and a tag memory storing an identifier of the breaker head and the notification. The notification is received by the antenna and is generated based on measurement data generated by a sensor for the breaker head.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
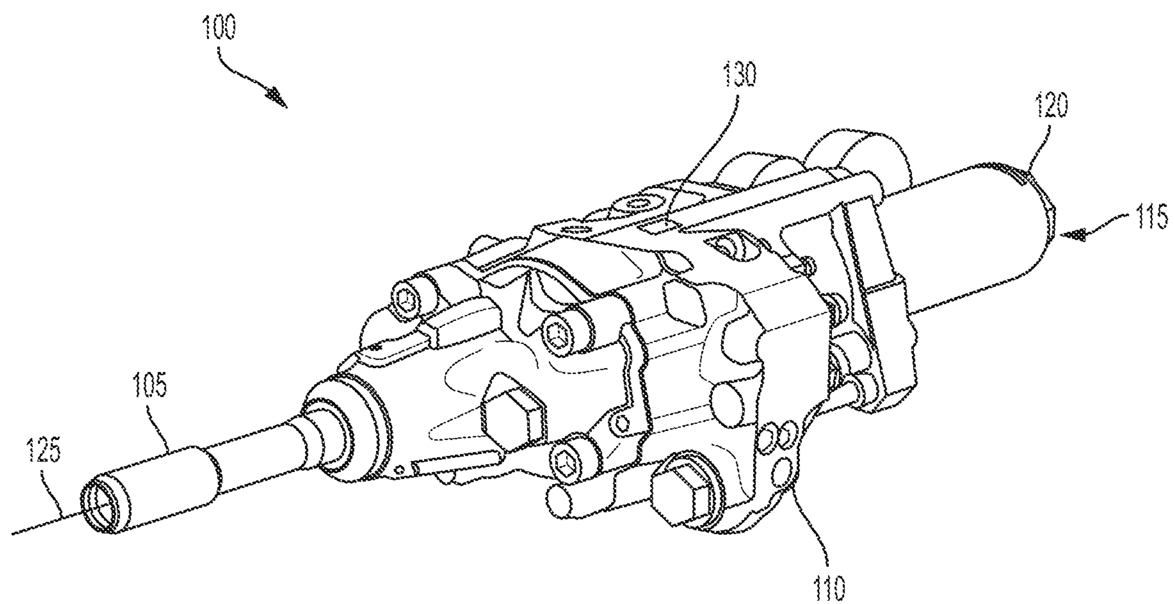
FIG. 1 illustrates a drifter attachment for a mining machine according to one embodiment.

FIG. 1 illustrates a drifter attachment 100 for a mining machine according to one embodiment. The drifter attachment 100 includes a hammer bit 105 and a drifter body 110. The drifter body 110 further includes a connection interface 115 and houses a hydraulic-driven rotational percussion mechanism. The connection interface 115 includes a coupling 120 that physically secures the drifter attachment 100 to a reciprocal coupling on a mining machine (e.g. at the end of a boom arm). The connection interface 115 further includes hydraulic connectors to receive fluid that drives a percussion mechanism. When driven, the rotational percussion mechanism rotationally and percussively drives the hammer bit 105. In other words, in operation, the hammer bit 105 rotates about a longitudinal axis 125 of the hammer bit 105 and repeatedly translates in and out of the drifter body 110 along the longitudinal axis 125. Accordingly, the drifter attachment 100, via the hammer bit 105, drills and hammers a worked material, such as concrete or rock, to break apart the worked material. The drifter attachment 100 may further include a wireless drifter tag 130, which is explained in further detail below.

Figure 2A:
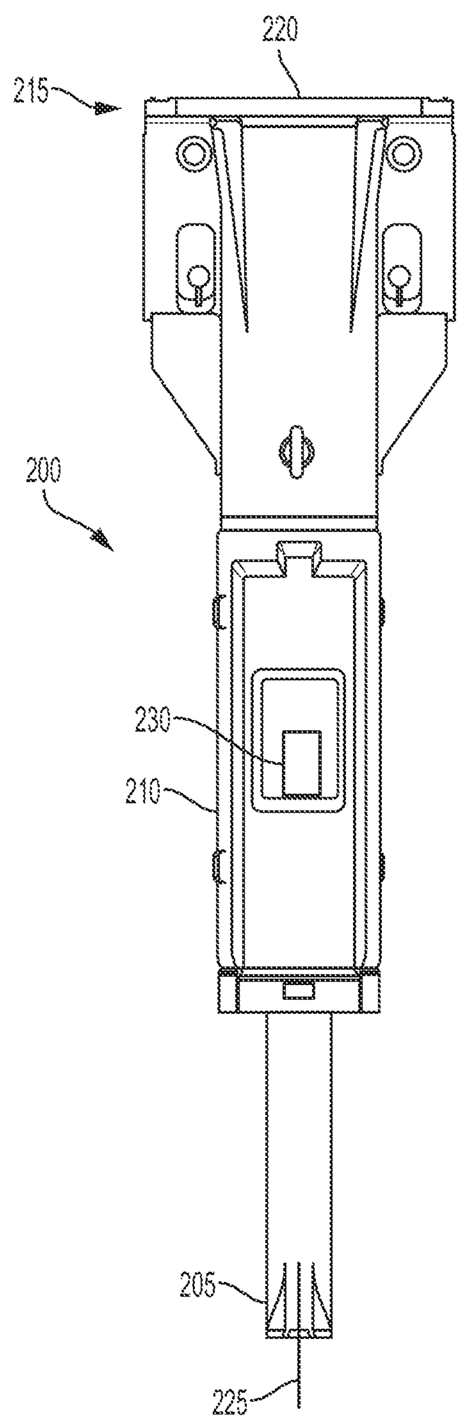
FIG. 2A illustrates a front view of a breaker attachment for a mining machine according to one embodiment.
Figure 2B:
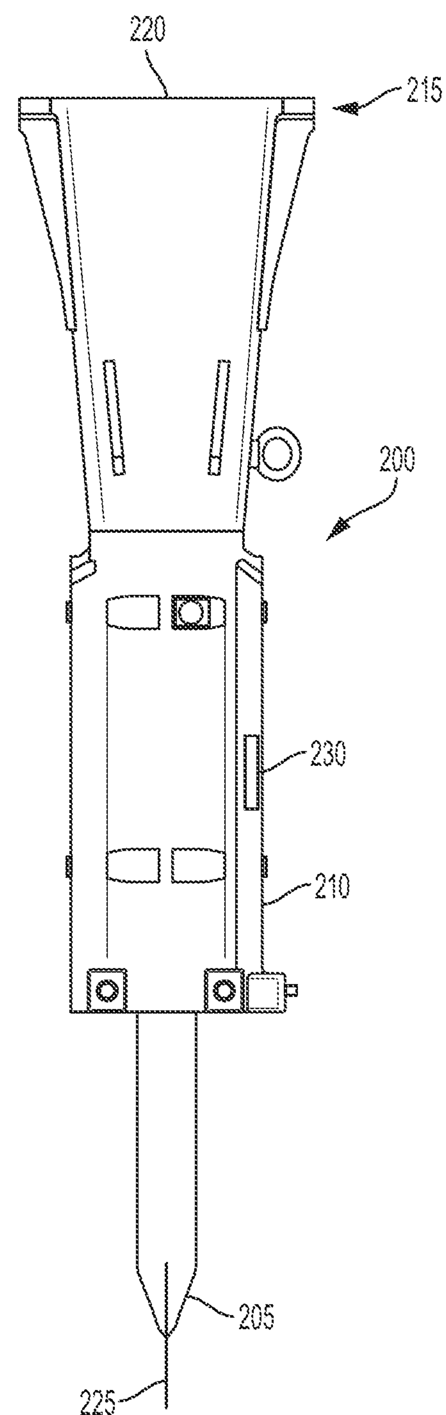
FIG. 2B illustrates a side view of a breaker attachment for a mining machine according to one embodiment.

FIG. 2A illustrates a front view of a breaker attachment 200 for a mining machine according to one embodiment. FIG. 2B illustrates a side view of the breaker attachment 200. The breaker attachment 200 includes a hammer bit 205 and a breaker body 210. The breaker body 210 further includes a connection interface 215 and houses a hydraulic-driven percussion mechanism. The connection interface 215 includes a coupling 220 that physically secures the breaker attachment 200 to a reciprocal coupling on a mining machine (e.g. at the end of a boom arm). The connection interface 215 further includes hydraulic connectors to receive hydraulic fluid that drives the percussion mechanism. When driven, the percussion mechanism percussively drives the hammer bit 205. In other words, in operation, the hammer bit 205 repeatedly translates in and out of the breaker body 210 along a longitudinal axis 225. Accordingly, the breaker attachment 200, via the hammer bit 205, drills and hammers a worked material, such as concrete or rock, to break apart the worked material. The breaker attachment 200 may further include a wireless breaker tag 230, which is explained in further detail below.

Figure 3:
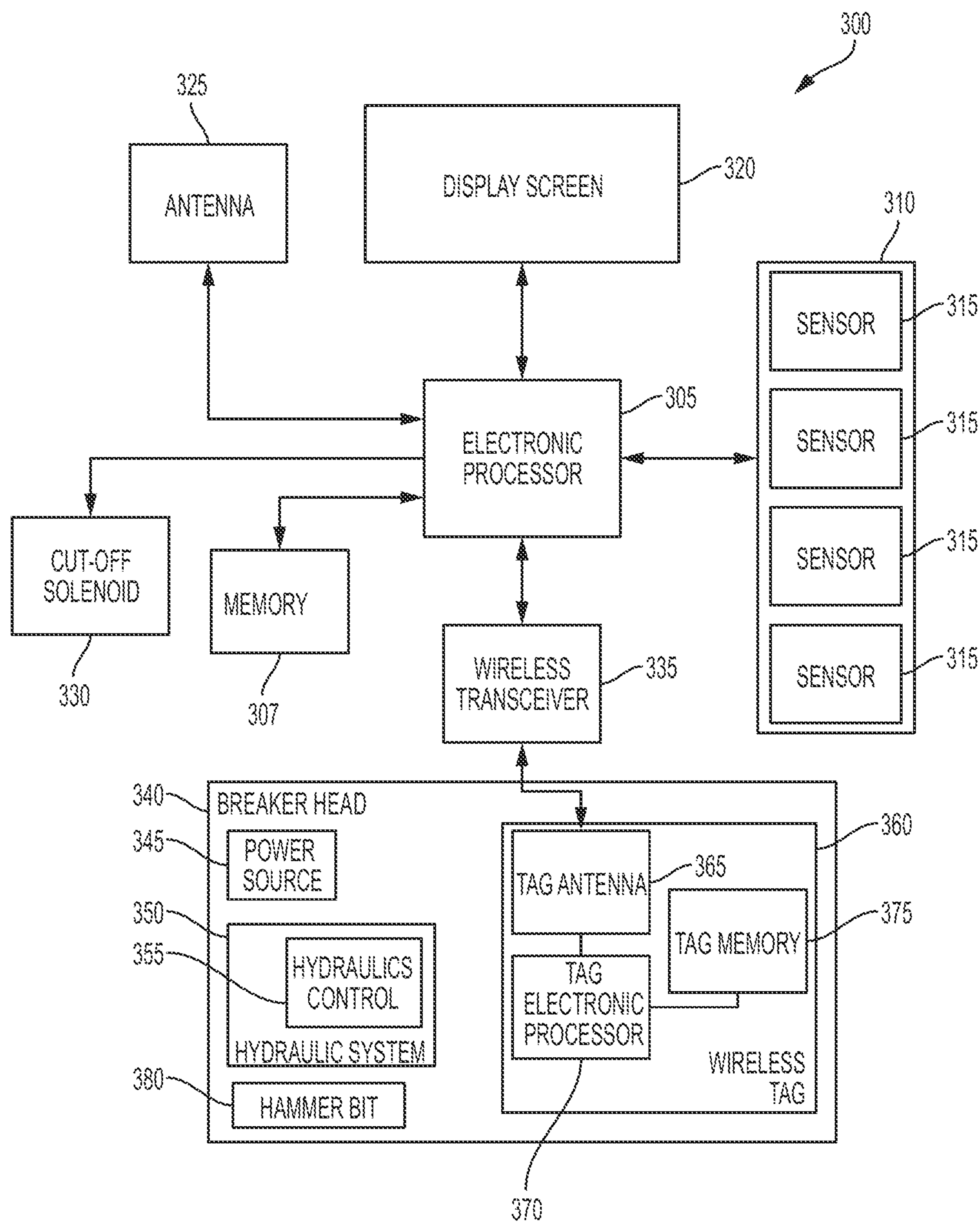
FIG. 3 schematically illustrates a system for monitoring an attachment of a mining machine according to one embodiment.

FIG. 3 schematically illustrates a system 300 for monitoring an attachment of a mining machine such as the drifter attachment 100 or the breaker attachment 200. The system 300 includes an electronic processor 305, a memory 307, a sensor block 310 including one or more sensors 315, a display screen 320, an antenna 325, a cut-off solenoid 330, a wireless transceiver 335, and a breaker head 340.

The electronic processor 305 may be a microprocessor, an application-specific integrated circuit (ASIC), or other suitable device. The electronic processor 305 is coupled to the memory 307, the sensor block 310, the display screen 320, the antenna 325, the cut-off solenoid 330, and the wireless transceiver 335 through one or more of a wireless network, dedicated wires, a communication bus, and the like. The memory 307 stores instructions and data used by the electronic processor 305 to perform the functionality of the electronic processor 305 described herein. In one embodiment, the memory 307 is a non-transitory computer-readable medium as described above.

In the sensor block 310, each of the one or more sensors 315 is configured to determine measurement data associated with the breaker head 340 and provide the measurement data to the electronic processor 305. In some embodiments, one or more of the sensors 315 are coupled directly to the breaker head 340 and determine measurement data associated with the breaker head 340 during operation of the breaker head 340. In other embodiments, one or more of the sensors 315 are coupled to a hydraulic system of the mining machine and determine measurement data associated with the breaker head 340 by monitoring the hydraulic system of the mining machine during operation of the breaker head 340.

The display screen 320 may be a liquid crystal display (LCD) screen, a light-emitting diode (LED) screen (e.g. a heads-up display), a projected screen, a touch screen, and the like. The display screen 320 includes one or more screens that are configured to display data to an operator and provide a graphical user interface for the operator to interface with the system 300.

The antenna 325 is configured to communicate with a wireless communication network, according to one embodiment. In one embodiment, the antenna 325 transmits data from the electronic processor 305 to a remote computing device, such as a server for storage, display, or both, via the wireless communication network. In another embodiment, the display screen 320 is located at the remote computing device and the antenna 325 transmits data from the electronic processor 305 to the display screen 320 via the wireless communication network.

The cut-off solenoid 330 is configured to stop the operation of the mining machine in response to commands from the electronic processor 305. In one embodiment, the cut-off solenoid 330 stops the operation of the mining machine by stopping the flow of fuel to the engine of the mining machine. In another embodiment, the cut-off solenoid 330 stops the operation of the mining machine by opening control or power paths to prevent flow of electrical signals in the mining machine.

The wireless transceiver 335 is configured to wirelessly communicate with a wireless identification tag 360 of the breaker head 340 by transmitting and receiving data. In one embodiment, the antenna 325 is omitted from the system 300 and the wireless transceiver 335 performs the functionality of the antenna 325 as well.

The breaker head 340 is an attachment for a mining machine. In one embodiment, the breaker head 340 is a breaker attachment, such as the breaker attachment 200 of FIG. 2. In another embodiment, the breaker head 340 is a drifter attachment, such as the drifter attachment 100 of FIG. 1. The breaker head 340 includes a power source 345, a hydraulic system 350 including a hydraulic controller 355, the wireless identification tag 360, and a hammer bit 380. The power source 345 may be a battery, a coupling to a power source on the mining machine, and the like.

The hydraulic system 350 is coupled to a hydraulic system of the mining machine to which the breaker head 340 is attached. In one embodiment, the hydraulic controller 355 of the hydraulic system 350 is an electronic controller that generates signals to control the hydraulic system 350. For example, the hydraulic controller 355 is configured to generate a signal to turn on the hydraulic system 350 in order to operate the hammer bit 380 and further configured to generate a signal to turn off the hydraulic system 350 to stop the operation of the hammer bit 380. For example, the signals may open and close valves, enable or disable pumps, or both, to control the flow and pressure of the hydraulic system 350 to enable, disable, or control striking operation of the breaker head 340.

The wireless identification tag 360, also referred to as a wireless tag 360, includes a tag antenna 365, a tag electronic processor 370, and a tag memory 375. The tag antenna 365, the tag electronic processor 370, and the tag memory 375 are communicatively coupled via a wired connection, a communication bus, and the like. In some embodiments, the wireless tag 360 receives power from the power source 345. In other embodiments, the wireless tag 360 has an independent power source (e.g., one or more battery cells) or receives power through electromagnetic waves of an external device, such as the wireless transceiver 335. In some embodiments, the wireless tag 360 is a radio-frequency identification (RFID) tag. In some embodiments, the wireless tag 360 serves as the wireless drifter tag 130 of FIG. 1. In some embodiments, the wireless tag 360 serves as the wireless breaker tag 230 of FIG. 2. In other words, the wireless drifter tag 130 and the wireless breaker tag 230 may be implemented by the wireless tag 360.

The tag antenna 365 is configured to wirelessly communicate with the wireless transceiver 335 to transmit and receive data. The tag electronic processor 370 may be a microprocessor, an application-specific integrated circuit (ASIC), and the like. The tag electronic processor 370 is configured to retrieve data stored in the tag memory 375, transmit the retrieved data to the wireless transceiver 335 via the tag antenna 365, receive data from the wireless transceiver 335 via the tag antenna 365, and store the received data in the tag memory 375. In one embodiment, the tag memory 375 is a non-transitory computer-readable medium as described above.

The wireless tag 360 is configured to store an identifier of the breaker head 340 in the tag memory 375. The identifier may be an attachment type (e.g. breaker attachment or drifter attachment), a serial number uniquely identifying the breaker head 340, a model number identifying the model of the breaker head 340, and the like. Furthermore, the wireless tag 360 is configured to store a notification in the tag memory 375 and to transmit the notifications that are stored, as described in further detail below.

The hammer bit 380 is driven by the hydraulic system 350 of the breaker head 340 and is configured to break apart a hard surface upon impact. In one embodiment, the hammer bit 380 is the hammer bit 105 of the drifter attachment 100. In another embodiment, the hammer bit 380 is the hammer bit 205 of the breaker attachment 200.

Figure 4:
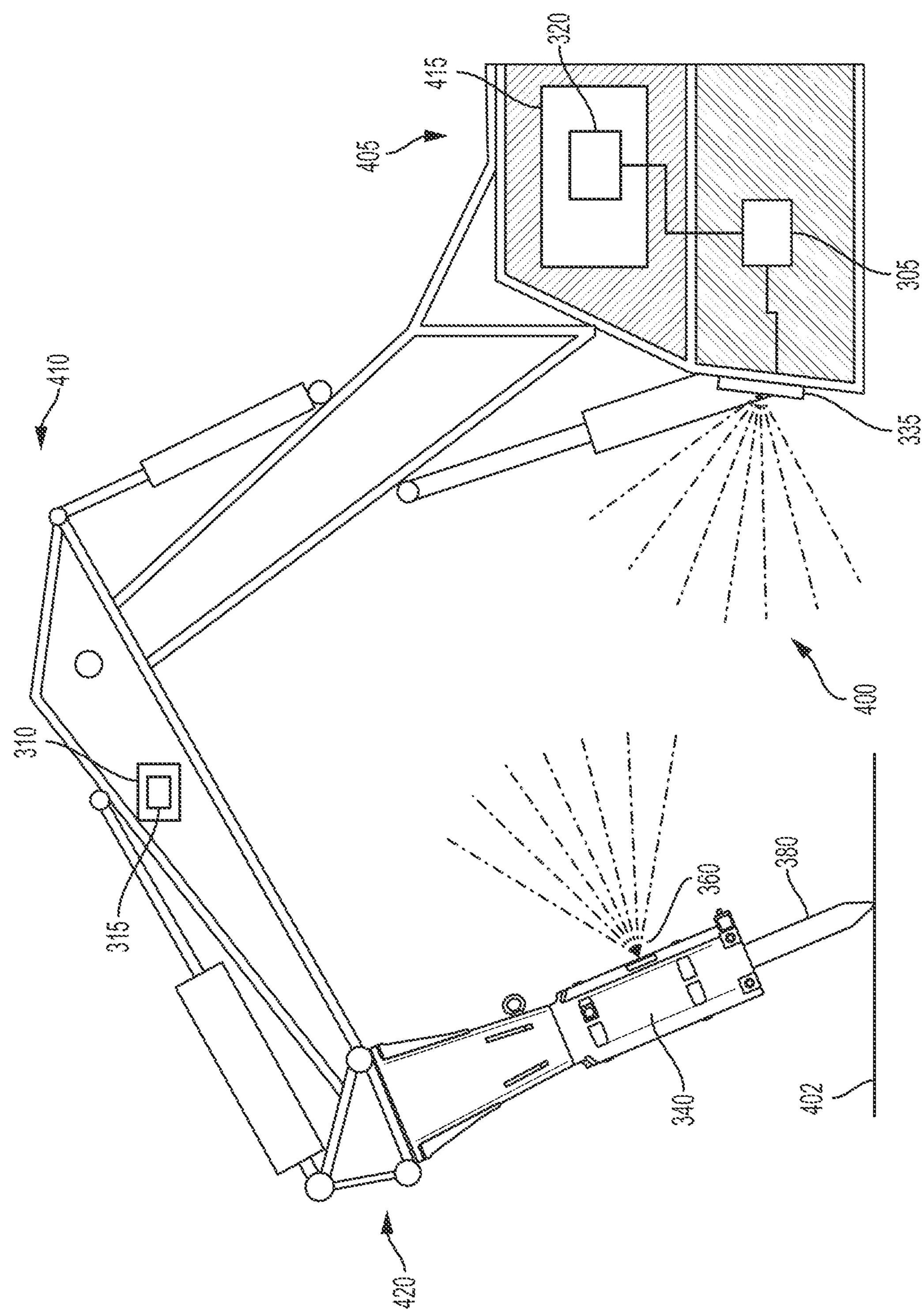
FIG. 4 illustrates a mining machine with an attachment operating in an environment according to one embodiment.

FIG. 4 illustrates a mining machine 400 with the breaker head 340 operating in an environment to break apart worked material 402, according to one embodiment. In the embodiment, the breaker head 340 is a breaker head similar to the breaker attachment 200 of FIGS. 2A-B. The mining machine 400 includes a base portion 405 and an articulating arm 410 coupled to the base portion 405. In one embodiment, as illustrated, the base portion 405 includes a cabin 415 in which an operator resides while operating the mining machine 400. The cabin 415 also includes the display screen 320 such that the operator may view the information being displayed on the display screen 320. The base portion 405 also includes the wireless transceiver 335 that may communicate with the wireless tag 360. As illustrated, the wireless transceiver 335 is on a front side of the base portion 405 nearest to the breaker head 340, on a same side of the base portion 405 as the side on which the articulating arm 410 extends away from the base portion 405. This positioning of the wireless transceiver 335 reduces the distance and obstacles that could disrupt or interfere with wireless communications between the wireless transceiver 335 and the wireless tag 360. Additionally, for similar reasons of reduced distance and obstacles, as illustrated, the wireless tag 360 is positioned on a side of the breaker head facing the base portion 405.

The articulating arm 410 further includes a coupling portion 420 configured to couple to the breaker head 340. The coupling portion 420 has hydraulic connections to engage the hydraulic system 350 of the breaker head 340 and mechanical couples to physically secure the breaker head 340 to the articulating arm 410. In one embodiment, the sensor block 310 and one or more sensor 315 are located on the articulating arm 410. In some embodiments, sensors of the one or more sensors 315 are located at different positions along the articulating arm 410, the base portion 405, the breaker head 340, or a combination thereof, to sense different data related to the breaker head 340.

Figure 5:
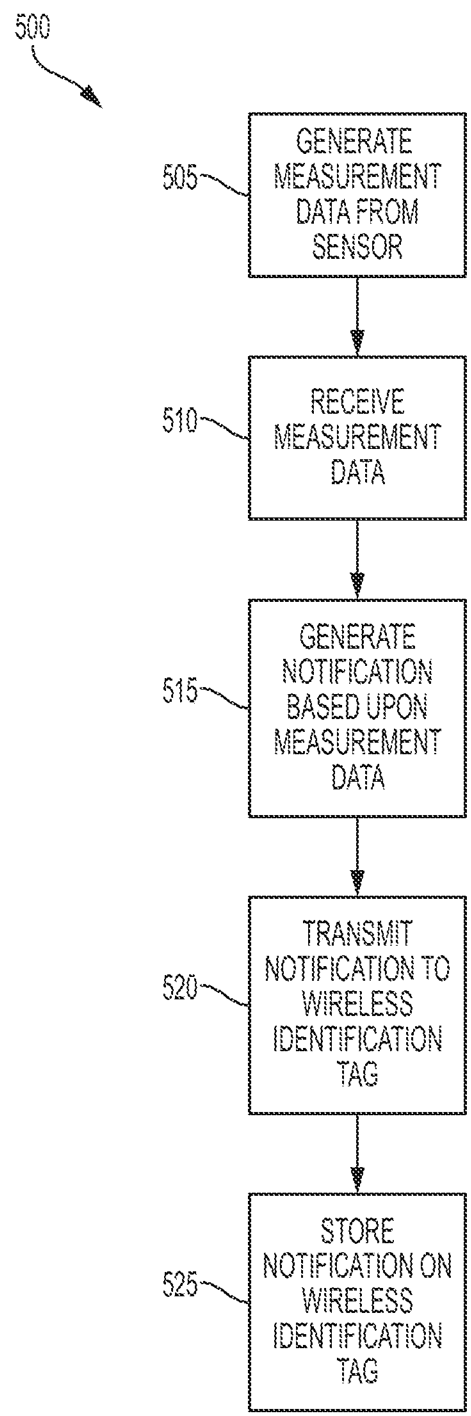
FIG. 5 is a flowchart for a method of monitoring an attachment of a mining machine according to one embodiment.

FIG. 5 is a flowchart illustrating a method 500 of monitoring an attachment for a mining machine according to one embodiment. Although the method 500 is described with respect to the systems and components of FIGS. 1-4, in some embodiments, the method 500 is implemented with other systems and components. Additionally, although the method 500 is described and illustrated as a series of blocks occurring sequentially, in some embodiments, one or more of the blocks of the method 500 are executed in parallel (wholly or in part) or are executed in a different order than illustrated.

In block 505, the one or more sensors 315 in the sensor block 310 generate measurement data for the breaker head 340. The measurement data may be a pressure of hydraulic fluid in the hydraulic system 350 of the breaker head 340, an indication of whether the breaker head 340 is operating, an indication of a strike of the hammer bit 380 against the worked material 402, an indication of a hammer action of the hammer bit 380, a rotational amount of the hammer bit 380 (e.g., in the case of a drifter attachment), a rotational speed of the hammer bit 380, and the like.

The measurement data generated by the one or more sensors 315 is transmitted, by the one or more sensors 315, to the electronic processor 305. In block 510, the electronic processor 305 receives the measurement data from the one or more sensors 315.

In block 515, the electronic processor 305 generates a notification based on the measurement data received in block 510. The notification includes one or more of the measurement data (i.e. the raw data, without being processed by the electronic processor 305), an operation log (e.g., time-stamped measurement data), a statistic (e.g., summation, average, or median of the measurement data), a fault, and the like. As one example, the electronic processor 305 monitors the measurement data indicating whether the breaker head 340 is operating and calculates a true operating time of the breaker head 340. In one instance, true operating time includes the time that the breaker head 340 is actively performing a breaking action (e.g., hammering or rotating), and does not include idle time of the breaker head 340. As another example, the electronic processor 305 monitors the measurement data indicating whether a strike or hammer action occurred, calculates a total number of strikes, hammer actions, or both, over the lifetime of the breaker head 340 or another time period (e.g., day, week, month, or the time period while engaged to the mining machine 400), or an average number of strikes, hammer actions, or both over the lifetime of the breaker head 340 or another time period (e.g., day, week, month, or the time period while engaged to the mining machine 400).

As another example, the notification is generated by the electronic processor 305 by comparing the measurement data to one or more thresholds to determine, for example, whether a fault exists. For example, a sensed pressure of the measurement data is compared to a low pressure threshold and, the notification is generated in response to determining that the sensed pressure is below the low pressure threshold. As another example, in block 515, one or more calculated parameter, such as the true operating time of the breaker head 340, the total number of strikes, the total number of hammer actions, the average number of strikes, the average number of hammer actions, the average rotational speed, the total number of rotations, and the like, are compared to one or more associated thresholds (e.g., a high level threshold or low level threshold). When an associated threshold is reached (e.g., when a calculated parameter is above a high level threshold or below a low level threshold), the notification is generated with an indication of the threshold(s) that were reached. Thus, the notification may indicate a fault based on actual usage of the breaker head 340, and may further include the calculated parameter(s) associated with the fault determination.

In block 520, the electronic processor 305 transmits the notification to the wireless tag 360. More particularly, the electronic processor 305 transmits the notification via the wireless transceiver 335 to the tag antenna 365 of the wireless identification tag 360. In one embodiment, the electronic processor 305 further transmits the notification to the display screen 320 to display to an operator of the mining machine 400. For example, if the notification is a system fault, the display screen 320 may turn red, flash, and display the fault name (i.e. "Fault in hydraulic system" if the notification is a fault in the hydraulic system 350 of the breaker head 340). In a further embodiment, the electronic processor 305 may transmit the notification via the antenna 325 to a remote location. For example, if the notification is a fault in the hydraulic system 350 of the breaker head 340, the electronic processor 305 may transmit the notification via the antenna 325 to a computer at a remote location over a communication network, indicating to an observer or overseer that a fault has been detected in the breaker head 340. In yet another embodiment, the electronic processor 305 may send the notification via the antenna 325 as an email to an overseer, observer, or owner of the breaker head 340 and the mining machine 400. Such an email includes one or more of a text description of the notification, the measurement data, the identity of the mining machine 400, and the identity of the breaker head 340.

In block 525, the tag electronic processor 370 stores the notification in the tag memory 375. In other words, the notification generated in the method 500 regarding the breaker head 340 is stored within the wireless tag 360 located on the breaker head 340.

The notification can then be retrieved from the wireless tag 360 using various techniques and devices. In some embodiments, the notification is retrieved by a second mining machine, which is constructed similar to the mining machine 400 and, accordingly, the description of the mining machine 400 similarly applies to the second mining machine. More particularly, after the notification is stored in the tag memory 375, the breaker head 340 may be detached from the mining machine 400 and attached to the second mining machine. The wireless transceiver of the second mining machine then receives the notification from the wireless tag 360. That is, the tag electronic processor 370 reads the notification from the tag memory 375 and transmits the notification via the tag antenna 365 to the wireless transceiver 335. The tag electronic processor 370 may perform these actions in response to a request from the wireless transceiver of the second mining machine or in response to detecting that the breaker head 340 is attached to the second mining machine (e.g., based on detecting power at the power source 345 or activation of the hydraulic system 350). Upon receiving the notification from the wireless tag 360, the electronic processor of the second mining machine may transmit the notification to the display device of the second mining machine for display to the operator. Thus, the operator may be informed of suggested maintenance, faults, true operation time, among other information about the breaker head 340 included in the notification.

Figure 6:
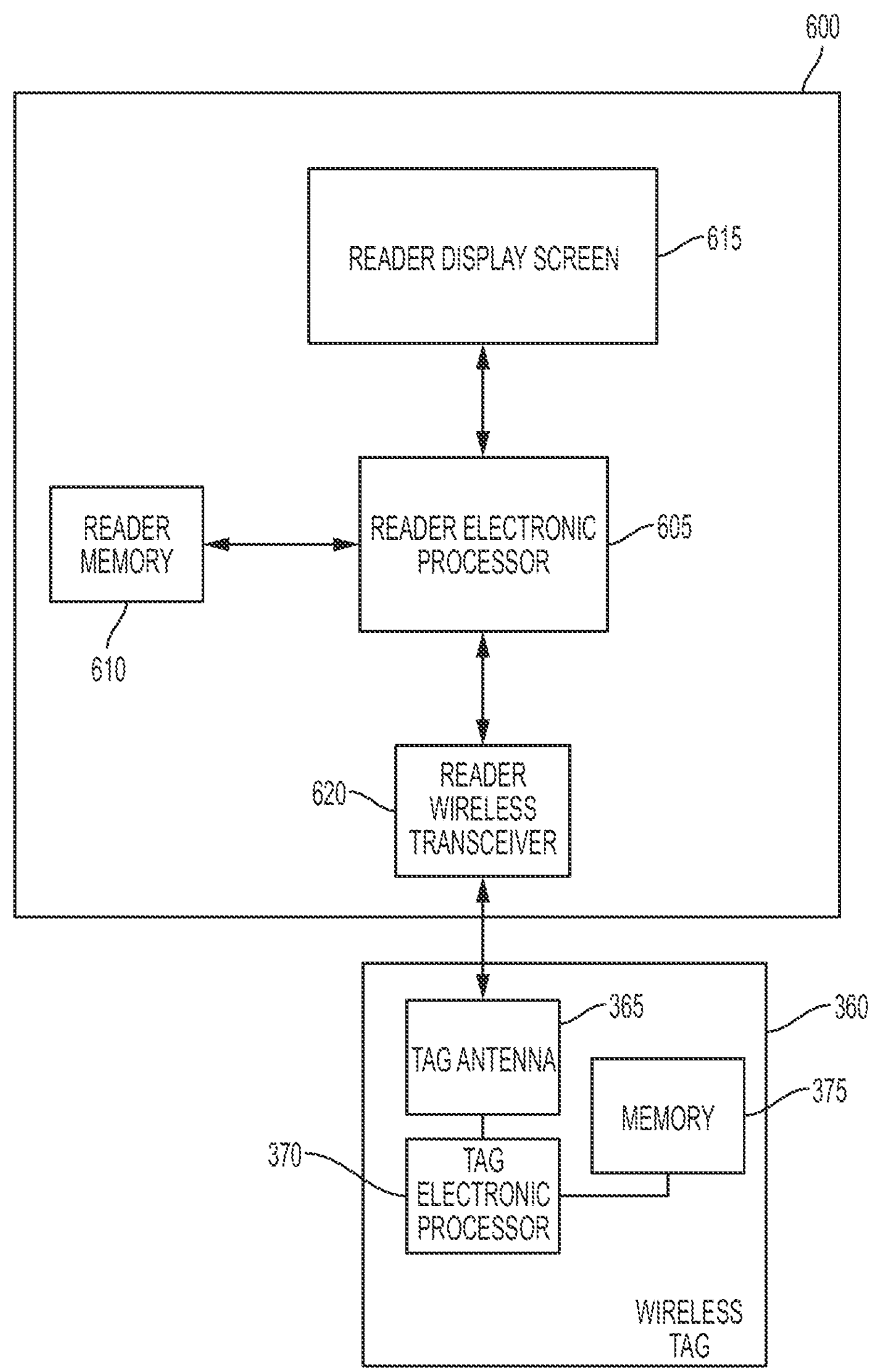
FIG. 6 illustrates a reader device according to one embodiment.

In some embodiments, a reader device 600 as illustrated in FIG. 6 is provided to retrieve the notification from the wireless tag 360. The reader device 600 includes a reader electronic processor 605 coupled to a reader memory 610, a reader display screen 615, and a reader wireless transceiver 620. The reader electronic processor 605 may be a microprocessor, an application-specific integrated circuit (ASIC), or other suitable device. The reader memory 610 stores instructions and data used by the reader electronic processor 605 to perform the functionality of the reader electronic processor 605 described herein. In one embodiment, the reader memory 610 is a non-transitory computer-readable medium as described above.

The reader display screen 615 may be a liquid crystal display (LCD) screen, a light-emitting diode (LED) screen (e.g. a heads-up display), a projected screen, a touch screen, and the like. The reader display screen 615 includes one or more screens that are configured to display data to a user of the reader device 600 and provide a graphical user interface for the user to interface with the reader device 600. In other words, the user is operable to control the reader device 600 via the graphical user interface provided on the reader display screen 615.

The reader wireless transceiver 620 is configured to wirelessly communicate with the wireless identification tag 360 of the breaker head 340 by transmitting and receiving data.

As noted, in some embodiments, the notification is retrieved by the reader device 600. More particularly, after the notification is stored in the tag memory 375 (for example, in block 525 of the method 500), the reader device 600 receives the notification from the wireless tag 360. That is, the tag electronic processor 370 reads the notification from the tag memory 375 and transmits the notification via the tag antenna 365 to the reader wireless transceiver 620. The tag electronic processor 370 may perform these actions in response to a request from the reader wireless transceiver 620. Upon receiving the notification from the wireless tag 360, the reader electronic processor 605 is configured to one or more of display the notification to the user of the reader device 600 and store the notification in the reader memory 610. In some embodiments, the reader device 600 is further configured to transmit the notification, via the reader wireless transceiver, to another computing device, such as a server or user computer, over a communication network. Thus, the user of the reader device 600 may be informed of suggested maintenance, faults, true operation time, among other information about the breaker head 340 included in the notification.

The reader device 600 may be used by a maintenance personnel performing maintenance or diagnosing faults of the breaker head 340. For example, in some embodiments, the breaker head 340 is disengaged from the mining machine 400 and transported to a remote maintenance facility. At that remote maintenance facility, the reader device 600 is used by maintenance personnel to retrieve the notification from the wireless tag 360 to obtain various information about the breaker head 340 such as described above.

The method 500 may further include a step for disabling the mining machine. For example, in one embodiment, the electronic processor 305 generates a signal to indicate to the cut-off solenoid 330 to stop operation of the mining machine. The signal is generated by the electronic processor 305 in response to measurement data from the sensor block 310. For example, upon generating certain notifications in block 515 of the method 500, in addition to transmitting the notification (in block 520), the electronic processor 305 sends a control signal to the cut-off solenoid 330 to stop operation of the mining machine. The certain notifications may include faults generated based on measurement data reaching predetermined thresholds as determined by the electronic processor 305.

The method 500 may further include a step for identifying the breaker head 340. When the wireless tag 360 is within a transmitting range of the wireless transceiver 335, the wireless tag 360 may transmit the identifier of the breaker head 340 stored in the tag memory 375 to the wireless transceiver 335, which is received by the electronic processor 305. In one embodiment, the electronic processor 305 uses the identifier to select or configure one or more sensors 315 and configure the notification generation performed in block 515. For example, when the identifier indicates that the breaker head 340 is a drifter attachment such as the drifter attachment 100, the electronic processor 305 may select the one or more sensors 315 that sense rotational data for the hammer bit 380 and strikes of the hammer bit 380. However, when the identifier indicates that the breaker head 340 is a breaker attachment such as the breaker attachment 200, the electronic processor 305 may select the one or more sensors 315 that sense strikes of the hammer bit 380, and disable or ignore one or more sensors 315 that sense rotational data because the hammer bit 380 of the breaker attachment does not rotate. Additionally, the sensitivity of the one or more sensors 315 may be adjusted based on the identifier.

Furthermore, the electronic processor 305 may adjust thresholds and other parameters used in block 515 to generate the notification based on the identifier. For example, the particular pressure thresholds used to determine whether a fault exists may vary by the particular model of breaker head 340. Additionally, the particular thresholds used to determine whether to suggest routine maintenance (e.g., number of strikes, true operation time, and the like) may vary by the particular model of breaker head 340.

Figure 7:
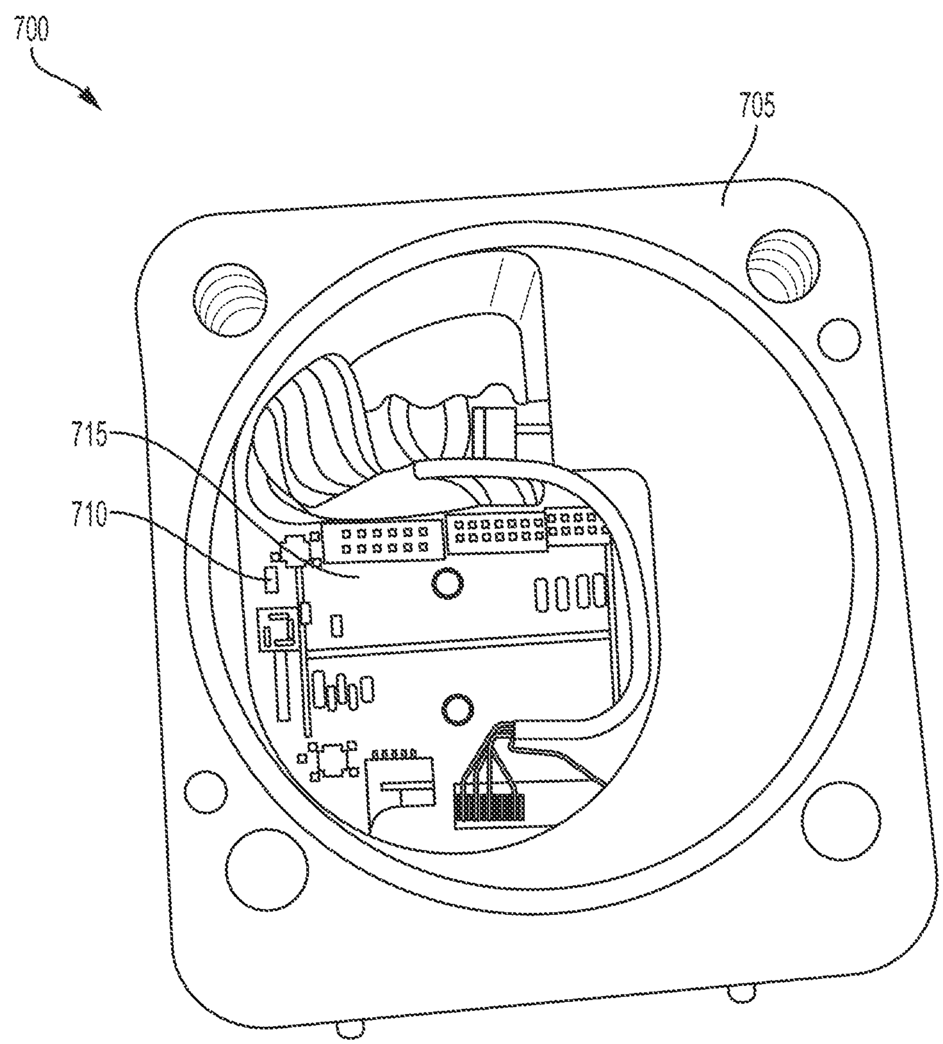
FIG. 7 illustrates a housing assembly according to one embodiment.

FIG. 7 illustrates a housing assembly 700 that may be used to house portions of the system 300. The housing assembly 700 includes a housing 705, a printed circuit board 710, and a power source 715. The printed circuit board 710 includes one or more of the electronic processor 305, the memory 307, the wireless transceiver 335, and at least one sensor of the one or more sensors 315. The electronics within the housing assembly 700 are powered by battery cells making up the power source 715. The housing 705 is a material designed to protect the other components of the housing assembly 700, such as steel, durable plastic, and the like. The housing 705 protects the components of the housing assembly 700 from potential debris and impacts. In some embodiments, the housing assembly 700 is coupled to the mining machine 400 of FIG. 4 facing the breaker head 340. For example, the housing assembly 700 is coupled to the mining machine 400 of FIG. 4 at the location of the wireless transceiver 335 in FIG. 4. In some embodiments, the housing assembly 700 includes more components from the system 300, such as the antenna 325. In some embodiments, the housing assembly 700 includes fewer components from the system 300. For example, the wireless transceiver 335 may be in the housing assembly 700, but the electronic processor 305 and the memory 307 may be located within the cab of the mining machine 400.

Figure 8:
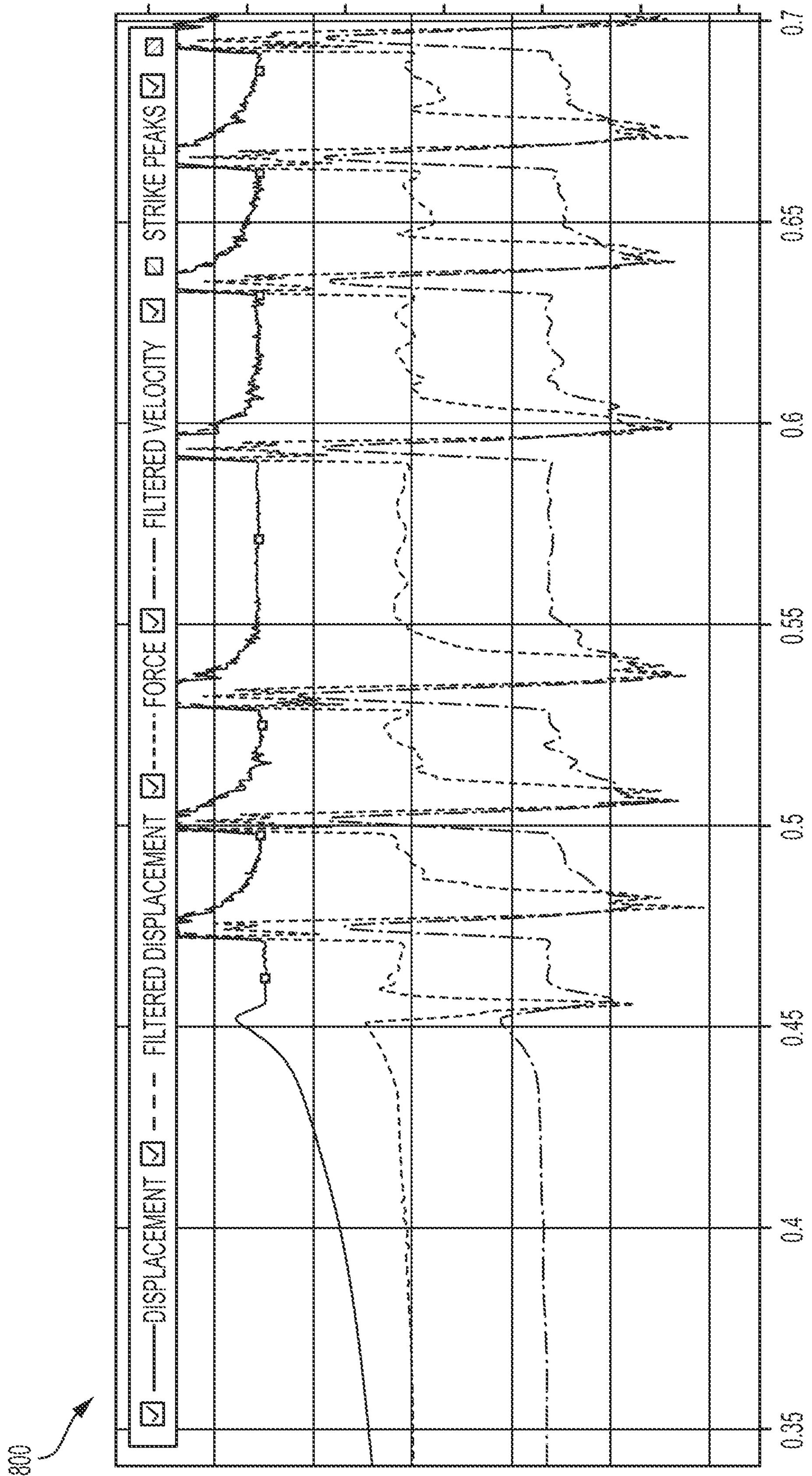
FIG. 8 illustrates a plot of measurement data according to one embodiment.

FIG. 8 illustrates a plot 800 of measurement data generated in some embodiments of the method 500. The plot 800 graphs several sensed characteristics, obtained as measurement data in block 510, over time including displacement (filtered and unfiltered) of the hammer bit 380, force of the hammer bit 380, velocity (filtered) of the hammer bit 380, and strike peaks of the hammer bit 380. The plot 800 may be included in the notification generated in block 520, and may be displayed on the display screen 320, the reader display screen 615, or another display.

Various features and advantages are set forth in the following claims.

The invention claimed is:

1. A method for monitoring an attachment for a mining machine, the method comprising:
- generating, by a sensor, measurement data for a breaker head;
- determining, by an electronic processor, a type of the breaker head by receiving, from a wireless identification tag coupled to the breaker head, an identifier of the breaker head;
- selecting, with the electronic processor, the sensor based upon the determined breaker head type;
- receiving, with the electronic processor, the measurement data for the breaker head from the sensor;
- generating, with the electronic processor, a notification based on the measurement data for the breaker head;
- transmitting, with the electronic processor, the notification to the wireless identification tag; and
- storing, on the wireless identification tag, the notification.

2. The method of claim 1, wherein the measurement data is at least one selected from the group consisting of a pressure of the breaker head, an operating time of the breaker head, and a number of impacts by the breaker head on a surface.

3. The method of claim 1, wherein the notification includes at least one selected from the group consisting of a fault warning, a statistic derived from the measurement data, and the measurement data.

4. The method of claim 1, further comprising:
- generating, with the electronic processor, a graphical representation of the notification; and
- displaying, with a display screen, the graphical representation.

5. The method of claim 4, further comprising sending, via the electronic processor, at least one selected from the group consisting of the measurement data and the notification to the display screen.

6. The method of claim 1, further comprising transmitting, via an antenna, the notification over a network.

7. The method of claim 1, wherein the notification includes information for later retrieval by a second electronic processor of a second mining machine, and wherein the information includes at least one of a fault warning of the breaker head, suggested maintenance of the breaker head, and true operating time of the breaker head.

8. The method of claim 1, wherein the wireless identification tag is an RFID tag.

9. The method of claim 1, wherein the sensor is one of a plurality of sensors, the method further comprising selecting, with the electronic processor, a first subset of the plurality of the sensors based on the determined breaker head type, disabling, with the electronic processor, a second subset of the plurality of the sensors based on the determined breaker head type, and receiving, with the electronic processor, the measurement data from the first subset of the plurality of sensors.

10. The method of claim 1, further comprising configuring, with the electronic processor, the sensor based upon the determined breaker head type.

* * * * *